July 27, 1943.  H. SCHERBAK  2,325,575
VACUUM DEVICE
Filed Oct. 3, 1939  2 Sheets-Sheet 1

INVENTOR.
Hermann Scherbak
BY Georg Benjamin
ATTORNEY.

July 27, 1943.  H. SCHERBAK  2,325,575
VACUUM DEVICE
Filed Oct. 3, 1939  2 Sheets-Sheet 2

INVENTOR.
Hermann Scherbak,
BY  George Benjamin
ATTORNEY.

Patented July 27, 1943

2,325,575

UNITED STATES PATENT OFFICE 2,325,575

VACUUM DEVICE

Hermann Scherbak, New York, N. Y.

Application October 3, 1939, Serial No. 297,659

4 Claims. (Cl. 99—272)

The object of the invention is a vacuum device for sealing rapidly by hand, or automatically, containers containing food etc., or empty, by pumping liquid from a tank encompassing said containers, in which device all joints are protected by liquid seal during evacuation.

By means of this invention even easily perishable foodstuffs like yeast, raw meat, fresh butter, cheese etc., can be conveniently and economically preserved without the use of artificial cold, steam, cooking, preservation chemicals, etc.

It is a purpose of the invention to provide for the possibility of removing, after evacuation, said containers from said tank in a substantially dry manner in spite of said liquid seal.

With this purpose in view the object of the invention is a vacuum sealing device comprising in combination a tank adapted to hold a working liquid, a cover for said tank, a liquid seal for said cover, an independent auxiliary tank, adapted to be mounted above said first mentioned tank so as to leave free the space above the opening thereof, conduits connecting said tanks, a pump connected with said first mentioned tank and adapted to pump liquid from the latter into said auxiliary tank through one of said conduits, means for draining liquid from said auxiliary tank into said first mentioned tank, and means for draining liquid from said seal into said first mentioned tank.

Other purposes, objects and features of the invention will appear from the following description in connection with the annexed drawings, in which Fig. 1 is a diagrammatic elevation, partly in section, of a device for sealing big milk transportation cans;

Figure 1:
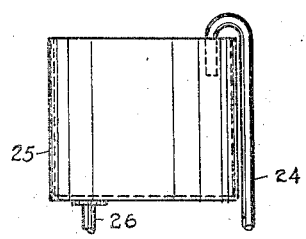
Figure 2:
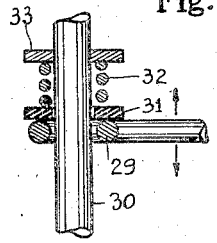
Fig. 2 is a vertical cross section through part of the driving mechanism provided for the vacuum pump.
Figure 3:
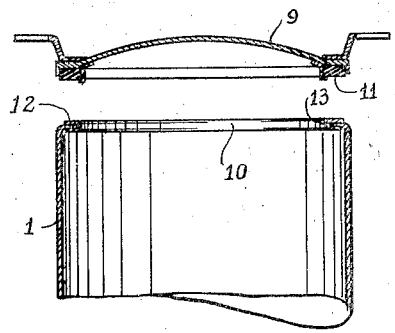
Fig. 3 is a vertical diagrammatic cross section, on a larger scale, through the cover and the adjacent part of said first mentioned tank, they being shown drawn apart for the sake of clearness.

In the device shown in Figs. 1 to 3 a tank 1 is provided for the reception of a large milk transportation can 2, provided with the usual handles 3 and lid 4.

The can 2 is not supported directly by the bottom 5 of the tank 1 but by an elevated support or false bottom 6 which may have conveniently the form of a sieve. Valved pipe connections 7 and 8 are provided for keeping the liquid beneath the support 6 in circulation, for conveying such liquid to a sterilization apparatus, etc.

A cover 9 (see also Fig. 3) serves for closing the opening 10 of the tank 1 and is connected with a gasket 11, secured thereto in any convenient manner. For avoiding damage to the cans 2, during the operation of introducing them into and taking them out of the tank 1, the opening 10 is confined by a frame or annular structure 12 consisting of sheet material doubled back upon itself to U-shape to form a rounded edge 13 for said opening.

The cover 2 is held down by clamp screws 14.

The cylindrical wall of the tank 1 has an upward extension 15 above the opening 10 for enclosing a space 16 available as a liquid seal for the cover 9.

To the under side of the cover 9 is secured a rubber block 17 which exerts upon the lid 4 sufficient pressure to enable this lid to act as a check valve with a narrow passage during evacuation. This pressure may be regulable by any convenient means. For sealing the joint between the lid 4 and the can 2 a gasket 18 is interposed between them.

Figure 10:
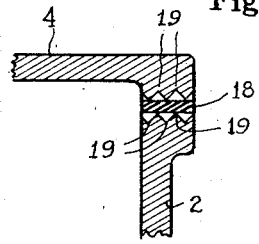
Fig. 10 is a partial vertical section on a larger scale through a container adapted to be sealed by means of the new device.

The joint seal between the parts 2 and 4 may have the form shown in Fig. 10. There the parts 2 and 4 are shown, each provided with more than one groove 19 for sealing by means of the gasket 18.

Separate spring means (not shown) may be provided for clamping down the lid 4 upon the can 2 independently of the rubber block 17.

A pump 21 is attached, preferably by welding, to the side of the tank 1 and communicates therewith by means of the hole 22 provided close to the bottom 5. This pump is operated from above adapted to convey liquid 23 from the tank 1 through a hose or pipe 24 into an auxiliary tank 25 arranged above, but laterally offset from the tank 1, so as to leave the space above the opening 10 unobstructed for the introduction of the cans 2 into and their removal from the tank 1 by a crane or the like also from above.

A hose or pipe 26 provided with a three-way valve 27 connects the bottom part of the tank 25 with the top part of the tank 1 or with the water seal space 16, respectively.

A vacuum gauge 28 permits observation of the degree of vacuum produced, and may be provided with means, not shown, for stopping automatically the evacuation upon production of a predetermined degree of vacuum.

Instead of said last mentioned means any known kind of slip coupling (not shown) may be provided, inserted into the rotary drive of the pump and adapted to make inoperative said drive as soon as the resistance of the pump 21, dependent on the vacuum, reaches a certain degree.

*Operation*

The can 2 is introduced into the tank 1 which preferably is substantially empty at least as far as its part above the blind bottom 6 is concerned. Then the cover 9 is applied and clamped down by means of the screws 14. Thereupon the three-way valve 27 is so adjusted as to introduce liquid from the auxiliary tank 25 through the pipe 26 into the main tank 1 until the latter is completely filled. This may be facilitated by a valved air vent opening (not shown) at the top of the tank 1.

Thereafter the valve 27 is so adjusted that liquid from the tank 25 flows into the space 16, thereby to form a liquid seal for the cover 9.

Thereupon the valve 27 is closed, and the pump 21 is operated, in a jerky manner, until almost all or the greater part of the liquid from the tank 1 hase been pumped through the pipe 24 into the tank 25. During this operation the lid 4 acts as a check valve permitting evacuation of the can 2 by the vacuum produced in the tank 1.

Even in the beginning of the evacuation, when the can 2 is submerged in liquid, the latter is prevented by the gasket 18 from entering the can 2. This is particularly true for the joint seal shown in Fig. 10, where the passages across the gasket 18 are so long, tortuous and narrow, that only an easily movable gas like air, but not a viscous liquid like water can pass.

After sufficient evacuation the operation of the pump 21 is stopped, preferably by the described means, and the valve 27 is so adjusted, that the liquid from the seal space 16 flows into the tank 1 and accumulates beneath the false bottom 6 whereupon air enters the tank 1 through this valve and/or the above-mentioned air vent for destroying the vacuum in the tank 1. The atmospheric air pressure now keeps the lid 4 on the can 2 hermetically sealed.

Now the cover 9 can be removed and the can 2 can be lifted out of the tank 1 and exchanged against another one by means of a crane (not shown), whereupon the operation is repeated.

Of course, instead of the valve 27 a separate valve and opening can be provided for connecting the space 16 with the tank 1.

Attention is called to the very important fact that, although all joints are protected by liquid on both sides in the new device, all manipulations in operating the latter are substantially dry.

Fig. 2 shows part of the pump drive. The ring member 29 is reciprocated by a rotary drive (not shown) along the piston rod 30 of the pump. In its upward stroke the member 29 hits sharply the ring 31 of rubber or the like slidable on the rod 30. Thereby the coil spring 32 is compressed and, by means of the collar 33, fixed on the rod 30, lifts the latter and operates the pump with a sharp jerk. This action is repeated as described above.

The period of this operation and the intensity of the jerk can be regulated by any known means, not shown.

Figure 4:
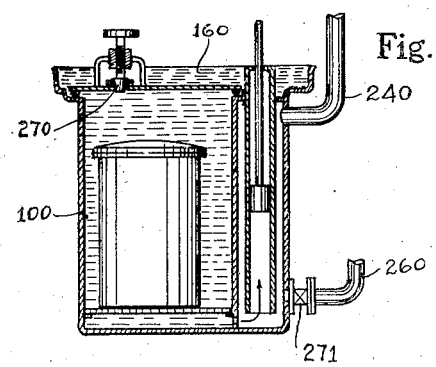
Fig. 4 is a view, similar to Fig. 1, of a modification.

In the modification, shown in Fig. 4, the three-way valve 27 of Fig. 1 is replaced by a one-way valve 270 and a one-way valve 271 which is inserted in the return pipe 260. The evacuation pipe is termed 240.

During evacuation both these valves are closed. Thereafter, the valve 270 is opened for draining the seal space 160 into the tank 100 as described above, and for admitting air into the tank 100.

For starting a new operation both valves are opened, and liquid flows from the auxiliary tank (not shown) through pipe 260 and valve 271 into the tank 100, and overflows through valve 270 into the seal space 160, whereupon both valves are closed and evacuation started as above described.

In the modification shown in Figs. 5 to 7 the tank 34 is again combined with a pump 35. In the preferred form, shown in Fig. 7, both these members form together a prismatic unit of continuous, shoulderless, substantially oval cross-section.

For introducing air into the tank 34, after evacuation, an opening 50 is provided. This opening may be kept closed during evacuation by a finger of the operator or by any appropriate valve, cock, cap or other member.

Figure 5:
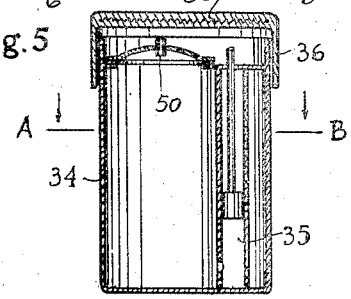
Fig. 5 is a diagrammatic vertical section of a modification of the object of the invention with the cover of the device in closed position.
Figure 6:
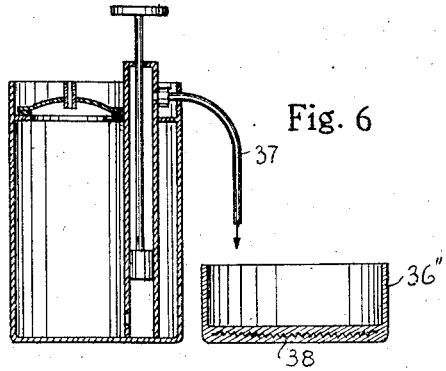
Fig. 6 is a section as in Fig. 5 with the cover used as a receptacle for water pumped out of the tank.

According to Figs. 5 and 6 the unit is provided with a cap 36, which may be locked upon the unit by any known means, for excluding dust and unauthorized manipulation. This cap, if desired, can be telescoped upon the lower part of the unit for avoiding waste of space and for reinforcing the unit against rough handling in manipulating.

The cap furthermore, in the position 36'' of Fig. 6, may be used as a receiver for the liquid delivered by the pump e. g. by means of a hose-pipe 37. It may be used also as a carrier for water etc.

Preferably, the cap is provided with an electric heating device 38, to be used for boiling and sterilizing the liquid, the gaskets, etc., and may be provided with a double bottom for waterbath heating (not shown).

Figure 8:
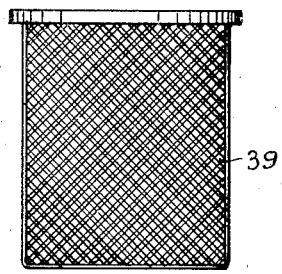
Fig. 8 is an elevation of a basket to be used in connection with the object of the invention.

Fig. 8 shows a basket 39 which may be inserted into the evacuation tank as a convenient means for handling simultaneously two or more containers which need not be of the same size.

Figure 9:
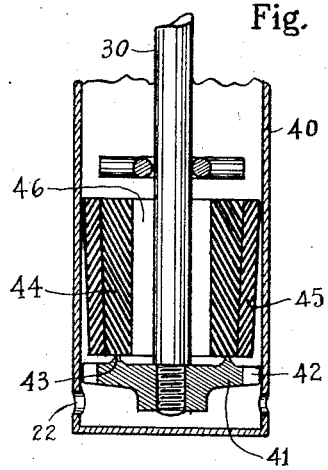
Fig. 9 is a vertical section of the pump piston on a larger scale.

Fig. 9 shows a pump piston particularly well suited for function in the desirable jerky operation.

The piston rod 30, adapted to be reciprocated in the pump cylinder 40 as described, is, at its lower end, rigidly connected with a front disk 41, shaped like a gear wheel whereby openings 42 are formed at its periphery for the passage of liquid.

On the upper surface of the disk 41 is formed an annular seat 43 for the pump piston proper which consists of a cylindrical soft inner layer 44 of rubber and of a harder outer layer 45 of stiffer rubber, which layers, preferably, are united by vulcanizing. The soft layer 44 has to seal on the seat 43, whereas the harder layer 45 has to seal on the cylinder wall and has to stand against the sliding friction during the reciprocation of the piston rod.

The described different qualities of both layers have been found extremely important for a permanent good function of the pump.

During the upward stroke of the piston it is pressed, by the liquid accumulated above it, against the seat 43 and is expanded against the wall of the cylinder 40. Liquid is sucked into the cylinder 40 through the hole 22 and a corresponding volume of liquid is displaced from the upper end of the cylinder.

During the downstroke of the piston it is lifted, by the pressure of the liquid therebeneath, from the seat 43, and such liquid may flow freely upward through the central bore 46 of the piston. Thereupon the operation is repeated.

Figure 7:
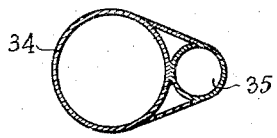
Fig. 7 is a diagrammatic cross section on the line A—B of Fig. 5.
Figure 11:
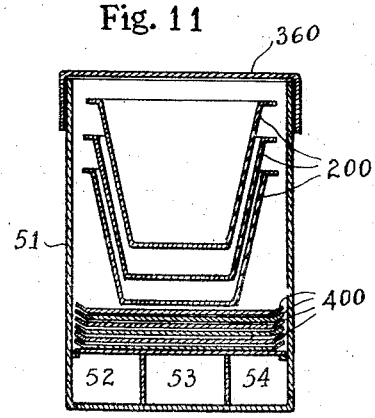
Fig. 11 is a diagrammatic vertical cross section through a box or casing e. g. for the device shown in Figs. 5–7.

The housing or box 51, shown in Fig. 11, may be used as a receptacle or carrier e. g. for the device shown in Figs. 5 to 7. When the evacuation device is not in this housing the latter may be used as a storage receptacle for a stack or pile of containers 200 to be evacuated by the device, and for a stack or pile of lids 400 for such containers.

Furthermore the housing may be provided with subdivisions or compartments 52, 53, 54, etc. for such necessities as e. g. a spirit stove, hard spirit, matches, knives, forks, spoons, gaskets, disinfectant, freezing salt, etc.

If desired the housing may be made large enough for containing simultaneously the evacuation device and all the above mentioned appurtenances.

The housing is provided with a cap 300.

It is important to note that for the operation of the new device, combining water seal on both sides of all joints with liquid evacuation and substantially dry handling, in addition to pumping only the adequately timed periodical control of a valve or two valves is necessary.

Figure 12:
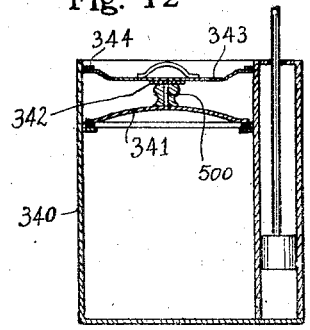
Fig. 12 is a vertical cross section through a modification of the device shown in Fig. 5.

In the modification shown in Fig. 12 the air opening 500 of the cover 341 of the tank 340 is closed by a gasket 342 secured to a bridge or leaf spring 343 which abuts against abutments 344 of the tank 340 and by its pressure, regulable by any known means, not shown, also presses the cover 341 down onto its seat.

The tank and the containers to be evacuated may have couplings so arranged that after evacuating a container it can be filled with inert gas for instance, if the contents are very perishable, as explosives, and the last trace of oxygen shall be eliminated, or if surgical instruments shall be kept in the most sterile manner.

What I claim is:

1. A vacuum sealing device, in combination, a tank adapted to hold a working liquid and provided with an opening, a cover for said opening, a liquid seal for said cover, an independent auxiliary tank, mounted above said first mentioned tank so as to leave free the space above the opening thereof, conduits connecting said tanks, a pump adapted to pump liquid from the first mentioned tank into said auxiliary tank through one of said conduits, means for draining liquid from said auxiliary tank into said first mentioned tank, means for draining liquid from said seal into said first mentioned tank and means for blocking both said drainings.

2. A vacuum sealing device comprising, in combination, a tank adapted to hold a working liquid and provided with an opening, a cover for said opening, a liquid seal for said cover, an independent auxiliary tank mounted above said first mentioned tank so as to leave free the space above the opening thereof, conduits connecting said tanks, a pump connected with said first mentioned tank and adapted to pump liquid from the latter into said auxiliary tank through one of said conduits, means for draining liquid from said auxiliary tank into said first mentioned tank, means for draining liquid from said seal into said first mentioned tank and means for blocking both said drainings.

3. A device as in claim 2, comprising further a support arranged at such a height above the bottom of said first mentioned tank that the space beneath said support has at least the same volume as the space provided for said liquid seal.

4. A vacuum sealing device comprising, in combination, a tank adapted to hold a working liquid and provided with an opening, a cover for said opening, a liquid seal for said cover, an auxiliary tank, piping connecting said tanks, a pump adapted to pump liquid from said first mentioned tank into said auxiliary tank through said piping, a chamber located below said liquid seal and adapted to receive substantially all the sealing liquid from said seal, and means for draining liquid from said seal into said chamber, the latter being adapted also to supply liquid to said pump.

HERMANN SCHERBAK.